United States Patent
Hima Bindu et al.

(10) Patent No.: US 11,866,658 B2
(45) Date of Patent: Jan. 9, 2024

(54) PRODUCT OF LOW BENZENE CONTENT DE-AROMATIZED DISTILLATES FOR SPECIALTY APPLICATIONS

(71) Applicant: Indian Oil Corporation Limited, Maharashtra (IN)

(72) Inventors: Vasamsetty Naga Veera Hima Bindu, Haryana (IN); Mainak Sarkar, Haryana (IN); Ganesh Vitthalrao Butley, Haryana (IN); Ramesh Karumanchi, Haryana (IN); Sarvesh Kumar, Haryana (IN); Madhusudan Sau, Haryana (IN); Sankara Sri Venkata Ramakumar, Haryana (IN)

(73) Assignee: Indian Oil Corporation Ltd.

( * ) Notice: Subject to any disclaimer, the term of this patent is extended or adjusted under 35 U.S.C. 154(b) by 0 days.

(21) Appl. No.: 18/084,099

(22) Filed: Dec. 19, 2022

(65) Prior Publication Data
US 2023/0193146 A1 Jun. 22, 2023

(30) Foreign Application Priority Data
Dec. 18, 2021 (IN) .............................. 202121059197

(51) Int. Cl.
*C10G 67/14* (2006.01)
*B01D 3/14* (2006.01)

(52) U.S. Cl.
CPC ............ *C10G 67/14* (2013.01); *B01D 3/148* (2013.01); *C10G 2300/1048* (2013.01); *C10G 2300/1096* (2013.01); *C10G 2300/202* (2013.01); *C10G 2300/301* (2013.01); *C10G 2300/308* (2013.01); *C10G 2300/4006* (2013.01); *C10G 2300/4012* (2013.01); *C10G 2300/4018* (2013.01)

(58) Field of Classification Search
CPC ............ C10G 67/14; C10G 2300/1048; C10G 2300/1096; C10G 2300/202; C10G 2300/301; C10G 2300/308; C10G 2300/4006; C10G 2300/4012; C10G 2300/4018; C10G 2300/4081; C10G 45/06; C10G 45/48; C10G 45/52; C10G 65/08; B01D 3/148
See application file for complete search history.

(56) References Cited

U.S. PATENT DOCUMENTS

| 2010/0300932 A1 | 12/2010 | Debuisschert et al. |
| 2016/0075955 A1 | 3/2016 | Candelon et al. |
| 2018/0291289 A1* | 10/2018 | Dhar ............... B01J 23/883 |

FOREIGN PATENT DOCUMENTS

| CN | 105670690 A | 6/2016 | |
| EP | 794241 A2 * | 9/1997 | ............ C10G 45/44 |
| EP | 0794241 A2 | 9/1997 | |

* cited by examiner

*Primary Examiner* — Randy Boyer
*Assistant Examiner* — Juan C Valencia
(74) *Attorney, Agent, or Firm* — Blank Rome, LLP

(57) ABSTRACT

A process for the production of ultralow aromatic specialty distillate from different refinery streams particularly high sulfur streams. The process produces de-aromatized distillates with benzene content below 1 ppmw. Hydrocarbon feedstock having boiling temperature in the range of 90 and 350° C., preferably 140 and 320° C. The hydrocarbon feedstocks are obtained from any petroleum-refinery or bio-refinery or any other source producing hydrocarbon streams.

19 Claims, 1 Drawing Sheet

PRODUCT OF LOW BENZENE CONTENT DE-AROMATIZED DISTILLATES FOR SPECIALTY APPLICATIONS

RELATED APPLICATION

This application claims the benefit of Indian Application No. 202121059197, filed on Dec. 18, 2021. The entire disclosure of this application is hereby incorporated by reference.

FIELD OF THE INVENTION

The present invention relates to production of de-aromatized distillates from refinery streams with benzene content less than 1 ppmw.

BACKGROUND OF THE INVENTION

Refined hydrocarbon streams have applications as fuel, specialty products and petrochemicals. Due to change in global energy demand pattern, government initiative for gas-based economy, and electrification of road, rail transport, the overall demand for liquid hydrocarbon fuel is projected to decline in near future. However, the non-fuel application (specialty products and petrochemicals) of hydrocarbon is projected to increase in future, and this will be one of the factors for incremental demand for fossil fuel.

In reference to the present invention, the de-aromatized distillates are also termed as specialty fluids/specialty chemicals/specialty solvents. They have wide applications in paint, decorative coatings, rust preventive fluids, metal working fluids, drilling fluids, inks, silicone sealants, solvent for resins, chilling fluids, viscosity depressants, extender oils in adhesives, cutting fluids, Electric discharge machining, aluminum rolling oils, crop protection fluids etc. In addition to the above, they are also used in high end applications such as cosmetic, pharmaceutical, food processing and industrial lubricants such as gear oils, turbine oils, textile oils, insulation oils, transmission fluids etc.

Among different properties (viz., Distillation, Flash point, viscosity, aromatic content, etc.), the most important and common specification for de-aromatized distillates is obviously the aromatic content. The aromatic content in various products varies depending on applications. For instance, if the de-aromatized distillates find application in pharmaceutical, cosmetic or food industry, the aromatic content should as low as 10 ppmw, whereas for drilling fluid, crop protection fluids, etc. the aromatic content may vary between 0.1 wt % to 1 wt %.

Another critical parameter, for producing marketable de-aromatized product is benzene content. Acceptable limit for benzene content for most of the marketable products is below 1 ppmw. This is a crucial process challenge particularly for low flash products. In this respect, it is pertinent to mention that there are certain product slates where the aromatic content is not so stringent, however, specification for benzene content is very stringent i.e., less than 1 ppmw.

Another constrain for producing de-aromatized distillate is the sulphur content. The sulphur content is not the only constrain with respect to meeting product specification however, it also a constrain with respect to process and catalyst. Therefore, in most of the prior art, low sulphur feedstocks have been considered for developing process for production of de-aromatized distillates.

The specialty distillates based on their flash point are classified into low, medium, and high flash products. Prior arts have classified specialty products based on their final boiling points (FBP) as well and generally termed as low (FBP<185° C.), medium (FBP<260° C.) and high boiling (FBP>260° C.) solvents/products. Whether, based on flash point or boiling point, both classification methodologies are synonymous, and it is obvious that low boiling specialty products are also low in flash whereas the high boiling products have high flash point.

Majority of the de-aromatized distillates currently marketed under the category of specialty products fall with the boiling range 90 to 350° C. The production of de-aromatized distillate is a challenge because aromatic content in different refinery streams vary from 7 to 40 wt %. De-aromatization of such streams to ppm level is challenging and particularly in presence of sulphur.

Thus, the present disclosure provides a process for production of de-aromatized distillate with benzene content less than 1 ppmw, using any type of refinery stream with boiling range between 90 and 350° C.

SUMMARY OF THE INVENTION

The present invention provides a process for production of de-aromatize distillate from hydrocarbon streams comprises of following steps:
a) treating hydrocarbon feedstock over hydrotreating catalyst under hydrogen, in a hydrotreating reactor system (Reactor-1) for converting hetero-atom contaminants into their respective hydrides;
b) flashing the effluent from Reactor-1 in high pressure separator (HPS), followed by withdrawing of off-gas containing un-reacted hydrogen along with inorganic and hydrocarbons compounds from the top of HPS and a liquid hydrocarbon from bottom of HPS;
c) flashing the liquid hydrocarbon effluent in low pressure separator (LPS) to remove dissolved gases and lighter hydrocarbon fraction having a boiling temperature below 90° C.;
d) processing LPS effluent in splitter and separating it into two fractions: i) a top fraction consisting of a hydrocarbon stream having a boiling temperature of 70-140° C., wherein said fraction is condensed and collected in a reflux drum, and ii) a bottom cut fraction consisting of a hydrocarbon stream having a boiling temperature of 140° C.-340° C.;
e) feeding a portion of the hydrocarbon liquid in reflux drum to the splitter as reflux and recycling the remaining part to the Reactor-1;
f) withdrawing a stream with benzene content less than 1 ppmw from reflux drum;
g) hydrogenating the bottom cut fraction in Reactor-2 over hydrotreating catalyst under hydrogen; and
h) fractionating effluent from step g) containing hydrocarbon stream having boiling range between 120-340° C. into narrow cuts in a fractionator to obtain de-aromatized distillates with required boiling range and flash point, the topmost cut is below 30 ppm and the bottom most cut is below 1000 ppmw In a feature of the present invention, the hydrocarbon feedstock comprises of streams having boiling temperature in the range of 90° C.-350° C., preferably between 120-330° C. and most preferably between 140-320° C.

In a feature of the present invention, the hydrocarbon feedstocks consist of a sulphur content in the range of 0.1-1.5 wt %, preferably in the range of 0.1-0.7 wt %; and a nitrogen content in the range of 50-1000 ppmw, preferably in range of 20-200 ppmw.

In a feature of the present invention, the hydrocarbon feedstocks consist of an aromatic content in the range of 5-40 wt %, preferably in the range of 15-25 wt %; and a di-aromatic content of ≤5 wt %, preferably ≤3 wt %; and a poly-aromatics content of ≤0.01 wt %, preferably ≤0.001 wt %. In another preferred feature of the present invention the Reactor-1 is operated at:
a. a weighted average bed temperature (WABT) of catalyst in the range of 250-450° C., preferably in the range of 300-375° C.;
b. a hydrogen partial pressure in the range of 30-120 $kg/cm^2$ g, preferably in the range of 40-75 $kg/cm^2$ g;
c. a linear Hourly Space Velocity (LHSV) in the range of 0.2-4 $h^{-1}$, preferably in the range of 0.75-2 $h^{-1}$; and
d. a hydrocarbon to hydrogen ratio in the range of 300-1200 $Nm^3/m^3$ preferably in the range of 500-700 $Nm^3/m^3$.

In another feature of the present invention, High-pressure separator (HPS) is maintained at a pressure in the range of 35-140 $kg/cm^2$ g, preferably 50-85 $kg/cm^2$ g; and at a temperature in the range of 260-350° C., preferably 230-270° C.

In yet another feature of the present invention, Low-pressure separator's (LPS) top part functions as separator and the bottom part loaded with hydrogenation catalyst acts as reactor.

In another feature of the present invention, LPS is operated at the temperature is in the range of 150-270° C., preferably in the range of 180-230° C.; at the pressure in the range of 9-27 $kg/cm^2$ g, preferably 11-18 $kg/cm^2$ g and with a residence time in the range of 40-15 minutes, preferably 40-15 minutes.

In another feature of the present invention, LPS is provided with hydrogenation catalyst comprising of metals selected from Group VIII, nickel, palladium or platinum or combination thereof on alumina support or any other material having higher or at least same surface area.

In yet another feature of the present invention, LPS are provided in two numbers in a lead lag arrangement.

In a feature of the present invention, boiling temperature of the top fraction is in range of 90-120° C.; and a benzene content is ≤40 ppmw, preferably ≤20 ppmw; and wherein the aromatic content is ≤60 ppmw, preferably ≤30 ppmw.

In a feature of the present invention, the bottom cut fraction is having a boiling temperature in the range of 120 and 320° C., and a benzene content ≤1 ppmw, preferably ≤0.1 ppmw and a aromatic content ≤5 wt %, preferably ≤2 wt %.

In a feature of the present invention, the ratio of recycle stream:reflux stream:product stream in step d) is between 5:7:1-20:7:1, preferably 5:7:1-10:7:1.

In a feature of the present invention, benzene content in stream of step f) is ≤0.1 ppmw; and the aromatic content is ≤50 ppmw, preferably ≤10 ppmw.

In a feature of the present invention, the bottom fraction of step g) is hydrogenated in reactor at weighted average bed temperature (WABT) is in the range of 150-300° C., preferably in range of 170-250° C.; average hydrogen partial pressure in the range of 20-75 $kg/cm^2$ g, preferably 40-60 $kg/cm^2$ g; and Linear hourly space velocity (LHSV) in the range of 1.5-4 $h^{-1}$, preferably 0.5-2 $h^{-1}$ and hydrocarbon to hydrogen ratio is in the range of 300-1200 $Nm^3/m^3$, preferably 500-700 $Nm^3/m^3$.

In a feature of the present invention, effluent of Reactor-2 is having an aromatic content ≤30 ppmw, preferably ≤10 ppmw.

In a feature of the present invention, effluent of Reactor-2 is fractionated into multiple fractions.

In a feature of the present invention, the topmost fraction is having a boiling temperature in the range of 140-240° C., preferably 120-220° C.; and an aromatic content ≤30 ppmw, preferably ≤10 ppmw.

In a feature of the present invention, the bottommost cut having boiling temperature in the range of 220-320° C., preferably 240-330° C.; and an aromatic content ≤100 ppmw, preferably ≤30 ppmw.

OBJECTIVES OF THE INVENTION

It is the primary objective of the present invention to provide a process for production of de-aromatized distillate with benzene content less than 1 ppmw.

It is further objective of the present invention to provide a process for production of de-aromatized distillate with benzene content less than 1 ppmw using any type of refinery stream with boiling range between 90 and 350° C.

It is further objective of the present invention that no pretreatment of feedstock is required for production of de-aromatized distillate.

It is further objective of the present invention that the aromatic content of product fractions is adjusted as per the requirement of product specification

BRIEF DESCRIPTION OF THE DRAWING

To further clarify advantages and aspects of the invention, a more particular description of the invention will be rendered by reference to specific embodiments thereof, which is illustrated in the appended drawing(s). It is appreciated that the drawing(s) of the present invention depicts only typical embodiments of the invention and are therefore not to be considered limiting of its scope.

DETAILED DESCRIPTION OF THE INVENTION

Figure 1:
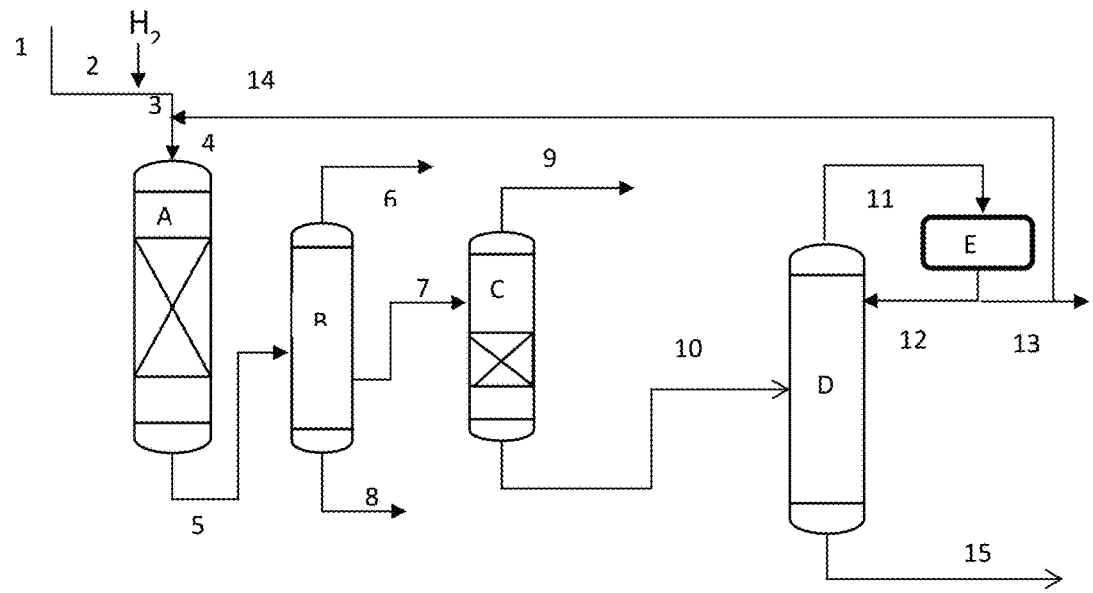
FIG. 1: illustrates schematic diagram of present invention.

For promoting and understanding of the principles covered by present invention, reference will now be made to the specific embodiments of the present invention further illustrated in the drawings and specific language will be used to describe the same. The foregoing general description and the following detailed description are explanatory of the present disclosure and are not intended to be restrictive thereof. It will nevertheless be understood that no limitation of the scope of the present disclosure is thereby intended, such alterations and further modifications in the illustrated composition, and such further applications of the principles of the present disclosure as illustrated herein being contemplated as would normally occur to one skilled in the art to which the present disclosure relates. Unless otherwise defined, all technical and scientific terms used herein have the same meaning as commonly understood by one of ordinarily skilled in the art to which this present disclosure belongs. The methods, and examples provided herein are illustrative only and not intended to be limiting.

The main embodiment of the present invention provides a process for production of de-aromatized distillates with benzene content below 1 ppmw. Feedstock for the process are hydrocarbon streams with boiling range between 90 and 350° C., preferably between 120 and 330° C. and most preferably between 140 and 320° C. The hydrocarbon streams for the process are obtained from any petroleum-refinery or bio-refinery or any other source producing hydrocarbon streams.

In said process the aromatic content in the feedstock vary in the range between 5 and 40 wt %, preferably between 10 and 30 wt % and most preferably between 15 and 25 wt %. In another embodiment, it is further disclosed that the aromatic content in the feedstock is predominantly mono-aromatic. The concentration of di-aromatic in feedstock is below 5 wt % preferably below 3 wt % and most preferably below 1 wt %. The Poly-aromatics in the hydrocarbon feed is preferably 0.01 wt % and most preferably below 0.001 wt %. The process is designed to handle the feedstock with any type of hetero-atom contaminants known in the art of refining of hydrocarbon streams generated from petroleum-refinery or bio-refinery or any other source producing hydrocarbon streams.

The process is designed for feedstock containing any type or form of hetero-atom known in the art of refining of petroleum or bio-feedstock or mixture thereof. Further, it is specified that, the sulphur compound in the feed is between 0.1 and 1.5 wt %, preferably between 0.1 and 1.0 wt % and most preferably between 0.1 and 0.7 wt %. Similarly, the Nitrogen compound in the feed is preferably between 50-1000 ppmw, most preferably, between 50 and 500 ppmw. In the same embodiment, it is further disclosed that if the feedstock is derived from any biological source, the contaminants and the nature of contaminant may vary accordingly.

In one of the embodiments, the process steps are described as:

Process step-1: The feedstock is processed in a hydrotreating reactor system (Reactor-1) in presence of hydrogen; over any hydrotreating catalyst system known in the art. The operating conditions for the hydro processing reactor are sufficient to undergo all types of reaction possible to occur within hydrotreating reactor environment known in the art. In the hydrotreating reactor under hydrogen environment, the hetero-atom contaminants are converted to their respective hydrides. Few of the common hydrides that are formed within the hydrotreating reaction, well known in the art of hydro processing are Hydrogen disulfide ($H_2S$), ammonia ($NH_3$), water ($H_2O$), Hydrochloric acid (HCl), etc. The metals both in organometallic form or any other inorganic form obtained from source of origin or due to corrosion are also trapped in the hydrotreating reactor over the guard bed/Demet catalyst forming the top layer of the active hydrotreating catalyst.

Process step-2: The effluent of Reactor-1 is flashed in high pressure separator (HPS), based on the prevailing equilibrium conditions, the off-gas containing unreacted hydrogen along with some inorganic and hydrocarbons compounds is withdrawn from the top and liquid hydrocarbon is taken out from bottom. The off-gas from HPS is rich in hydrogen and it is recycled back to the Reactor-1 after purification and compression. The liquid effluent from HPS contains a portion of dissolved gases viz. $C_1$-$C_4$ hydrocarbons, $H_2S$, $H_2$ etc. The concentration of dissolved gases in HPS effluent depends on the equilibrium concentration at the operating condition maintained within HPS.

Process step-3: The liquid effluent of HPS is further flashed in low pressure separator (LPS), for removing the dissolved gases and some part of lighter hydrocarbon fraction preferably boiling below 90° C. produced in process step-1. The dissolved gases and the light hydrocarbon fractions are withdrawn from the top of the LPS and sent to further processing unit from where the gaseous portion is sent to fuel gas header and the lighter liquid hydrocarbon fraction is sent to a suitable destination. The liquid hydrocarbon stream is withdrawn from the bottom of LPS. At least a fraction of bottom part of the LPS is loaded with hydrogenation catalyst system particularly targeting benzene hydrogenation in the liquid effluent. The dissolved hydrogen present in LPS liquid effluent is used for the hydrogenation reaction.

Process step-4: The LPS effluent thus obtained after flashing followed by in-situ hydrogenation reaction in Process step-3 is divided into two fractions in a splitter. The top fraction preferably contains hydrocarbon stream boiling between 70 and 140° C. is withdrawn from the splitter top and after condensation is collected into reflux drum. At least a portion of the hydrocarbon liquid in reflux drum is fed to the splitter as reflux and the remaining part is recycled back to the Reactor-1 in Process step-1 along with fresh feedstock. After sufficient elapse of time and attending steady state, a third stream is withdrawn from the reflux drum with benzene content preferable less than 1 ppmw and aromatic content preferably less than 100 ppmw. The bottom fraction withdrawn from the splitter bottom contains hydrocarbons with boiling range preferably between 140 and 340° C. The benzene content in splitter bottom is preferably less than 0.5 ppmw and aromatic content preferably less than 1 wt %.

Process step-5: The primary objective of this process step is to produce medium flash and high flash ultra-low de-aromatized distillates. Accordingly, the bottom fraction obtained from Process step-4 is further processed in a hydrogenation reactor system (Reactor-2) in presence of hydrogen; over hydrogenation catalyst system known in the art. The process conditions maintained in Reactor-2 is suitable for hydrodearomatization (HDA) reactions. The aromatic content in the Reactor-2 effluent is preferably below 300 ppmw.

Process step-6: The effluent of process step-5 containing hydrocarbon stream boiling between 120 and 350° C. is fractionated into narrow cuts in a fractionator for generating de-aromatized distillates with specific boiling range and flash points. The aromatic content in top cut and the bottom cut is preferably below 30 ppm and 1000 ppmw respectively.

In another embodiment, it is disclosed that the process step comprises of following steps:

Process step-1: The feedstock is processed in a hydrotreating reactor system (Reactor-1) in presence of hydrogen, over hydrotreating catalyst system known in the art. The operating conditions for the hydro processing reactor are sufficient to undergo all types of reaction possible to occur within hydrotreating reactor environment known in the art. In the hydrotreating reactor under hydrotreating environment, the hetero-atom contaminants are converted to their respective hydrides. Few of the common hydrides that are formed within the hydrotreating reaction, well known in the art of hydro processing are Hydrogen disulfide ($H_2S$), ammonia ($NH_3$), water ($H_2O$), Hydrochloric acid (HCl), etc. The metals both in organometallic form or any other inorganic form obtained from source of origin or due to corrosion are also get trapped in the hydrotreating reactor over the guard bed/Demet catalyst forming the top layer of the active hydrotreating catalyst.

The particular process conditions for Process of step-1 are disclosed as below:

Weighted average bed temperature (WABT) of catalyst is preferably between 250 and 450° C., more preferably between 275 and 400° C. and most preferably between, 300 and 375° C.

Average hydrogen partial pressure inside Reactor-1 is between 30 and 120 kg/cm$^2$ g, more preferably between 30 and 90 kg/cm$^2$ g and most preferably between 40 and 75 kg/cm$^2$ g.

The contact time of feed with catalyst, defined in terms of Linear Hourly Space Velocity (LHSV) is preferably between 0.2 and 4 more preferably between 0.5 and 3 and most preferably between 0.75 and 2 h$^{-1}$.

The hydrocarbon to hydrogen ratio is preferably between 300 and 1200 Nm$^3$/m$^3$, more preferably between 300 and 1000 Nm$^3$/m$^3$, and most preferably between 500 and 700 Nm$^3$/m$^3$.

Process step-1 removes all hetero-atomic impurities, still some de-aromatization is also targeted in this step. Accordingly, the WABT for Process step-1 is maintained at that temperature where equilibrium favors de-aromatization reaction. The equilibrium temperature is function of average hydrogen partial pressure inside Reactor-1. Accordingly, WABT of Reactor-1 is maintained depending on hydrogen partial pressure, concentration of hetero-atom atoms, and the contact time between catalyst and feed.

In an embodiment, it is described that the Reactor-1 effluent is free from heteroatomic impurities; particularly, Sulphur, Nitrogen, Chloride and oxygenates. The concentration of these impurities in the Reactor-1 effluent is preferably, below 1 ppmw, more preferably below 0.5 ppmw and most preferably below 0.1 ppm. Maintaining low impurities in Reactor-1 effluent is essential for downstream processes.

In another embodiment, the catalyst system in Reactor-1 of Process step-1 is conventional hydrotreating catalyst known in the art and active in sulfide form. The catalyst system of Reactor-1 is comprised of at least one metal from Group VI, preferably molybdenum and at least another metal from Group VIII, preferably nickel on alumina or any other material having higher or at least same surface area and stability as alumina.

The Reactor-1 effluent generated in Process step-1, contains at least 15% lighter boiling fraction, preferable 10% lighter boiling fraction and most preferably 5% lighter boiling fractions compared to feedstock. The lighter boiling fractions are generated in Process step-1 due to (i) hydrogenation reaction followed by hydro-de-sulfurization (HDS), hydro-de-nitrogenation (HDN), hydro-de-oxygenation (HDO), etc. reactions and (ii) thermal/catalytic hydrocracking reactions occurring within the Reactor-1 by virtue of temperature and mild cracking activities of alumina support.

The boiling range of Reactor-1 effluent is preferably between 34 and 350° C., more preferably between 60 and 330° C. and most preferably between 70 and 320° C. In this embodiment, it is disclosed that the lighter boiling fraction preferably between 70 and 140° C. generated during Process step-1 is finally converted into low flash de-aromatized distillate, whereas the fraction boiling above 140° C. up to final boiling point (FBP) are utilized for medium and high flash distillates.

The aromatic content in Reactor-1 effluent, is preferably lower than the feed aromatic content. The mono-aromatics in Reactor-1 effluent is preferably between 5 and 25 wt %, preferably between 1 and 20 wt % and most preferably between 7 and 15 wt %. The di- and Poly aromatic hydrocarbon (PAH) in Process step-1 product is preferably below 10 ppmw and most preferably below 1 ppmw. PAH are hydrocarbons with at least 3 aromatic ring. The aromatic content in Reactor-1 effluent may increase compared to feed aromatics if the operating parameters in Process step-1 is not properly maintained.

Further, the benzene content in effluent of Reactor-1 is preferably between 20 and 100 ppmw, more preferably between 30 and 70 ppmw and most preferably between 40 and 60 ppmw.

Process step-2: The effluent of Reactor-1 is flashed in high pressure separator (HPS), the off-gas containing unreacted hydrogen along with some gaseous inorganic and organic compounds are withdrawn from the top and liquid hydrocarbon is taken out from bottom. The off-gas from HPS is rich in hydrogen and it is recycled back to the Reactor-1 after purification and compression. The liquid effluent from HPS also contains a certain portion dissolved gas viz. $C_1$-$C_4$ hydrocarbons, $H_2S$, $H_2$, etc. The concentration of dissolved gases in HPS effluent depends on the equilibrium concentration at the operating condition maintained within HPS.

High pressure separator (HPS) is a 3-phase separator and maintained at Reactor-1 outlet pressure, between 35 and 140 kg/cm$^2$ g, more preferably between 35 and 120 kg/cm$^2$ g and most preferably between 50 and 85 kg/cm$^2$ g. The temperature of HPS is preferably between 260 and 350° C. and more preferably between 250 and 300° C. and most preferably between 230 and 270° C.

In yet another embodiment, the provision for 3$^{rd}$ phase in HPS is provided for $H_2O$ and dissolved HCl, $NH_3$ and $H_2S$. This provision is workable in case at least a portion of feedstock in Processing step-1 is derived from vegetable sources or bio-refinery.

In another embodiment, the liquid hydrocarbon effluent withdrawn from the HPS bottom is saturated with $H_2S$ and other $C_1$ to $C_4$ gaseous hydrocarbon. This effluent is then flashed in low pressure separator (LPS).

Process step-3: The liquid hydrocarbon effluent withdrawn from HPS bottom is further flashed in low pressure separator (LPS), for removing the dissolved gases and some part of lighter hydrocarbon fraction preferably boiling below 90° C. The dissolved gases and the light hydrocarbon fractions are withdrawn from the top of the LPS and sent to further processing unit, the gaseous portion is sent to fuel gas header and the lighter liquid hydrocarbon fraction is sent to a suitable destination, wherein it is blended with refinery stream, preferably gasoline pool. The liquid hydrocarbon stream is withdrawn from the bottom of LPS. At least a fraction of bottom part of the LPS is loaded with hydrogenation catalyst system particularly targeting benzene hydrogenation in the liquid effluent. The dissolved hydrogen present in LPS effluent is used for the hydrogenation reaction.

In one of the embodiments, the LPS system of the present invention removes at least a portion of liquid hydrocarbon boiling preferably below 110° C., more preferably below 90° C. and most preferably below 85° C.

In yet another embodiment the LPS is operated between 10 and 30 kg/cm$^2$ g, more preferably between 10 and 25 kg/cm$^2$ g and most preferably between 12 and 20 kg/cm$^2$ g pressure. Further for eliminating at least a portion of lighter fraction along with LPS off-gas, the LPS temperature is maintained between 150 and 270° C., more preferably between 170 and 250° C. and most preferably between 180 and 230° C.

The elimination of lighter fraction along with other dissolved gases in LPS is important to maintain lower benzene concentration in the LPS bottom liquid. The benzene content in LPS bottom is further reduced by hydrogenating at least a portion to cyclo-hexane over hydrogenation catalyst system loaded at the bottom portion of the LPS system.

In yet another embodiment, for benzene reduction the LPS is modified to operate as 2 phase separators cum reactor system where, the top part of the LPS is operated as 2-phase separator, whereas the bottom part is operated as Hydro de aromatization (HDA) reactor.

In another embodiment, the benzene content in LPS effluent is preferably below 30, more preferably below 20 ppmw and most preferably below 10 ppmw.

In one of the embodiments, the hydrogenation reaction taking place at the bottom of LPS is a liquid phase reaction and the dissolved hydrogen present in LPS effluent is consumed. No additional hydrogen is supplied for this purpose.

The process conditions for Process step-3 are disclosed:

Temperature between 150 and 270° C., preferably between 170 and 250° C. and most preferably between 180 and 230° C.

Pressure between 9 and 27 kg/cm² g, preferably between 9 and 23 kg/cm² g and most preferably between 11 and 18 kg/cm² g pressure.

Residence time preferably between 40 and 15 minutes, preferably between 50 and 20 minutes and most preferably between 60 and 30 minutes.

The residence time in LPS also translates to Linear hourly space velocity (LHSV) between 1.5 and 4 h$^{-1}$, more preferably between 1.2 and 3 h$^{-1}$ and most preferably between 1.0 and 2 h$^{-1}$ with respect to hydrogenation catalyst.

In yet another embodiment the catalyst system loaded in LPS, is any conventional hydrogenation catalyst known in the art. The catalyst is active in reduced form. The catalyst system is comprised of metal or metals from Group VIII, preferably nickel more preferably Palladium or Platinum or combination thereof on alumina support or any other material having higher or at least same surface area and stability as alumina.

The hydrogenation catalyst system loaded in LPS is susceptible to H$_2$S and hence gets deactivated within 3 and 6 months, accordingly, for continuous operation, it is further the provision for at least 2 numbers of LPS in lead lag arrangement is required.

LPS cum reactor arrangement of the present invention provides 2 distinctive benefits,
 (i) eliminates portion of benzene from the system, to meet the specifications of some low flash solvents.
 (ii) eliminates the risk of H$_2$S ingression in the downstream equipment, the arrangement substitutes the requirement of stripper.

Process step-4: The LPS effluent obtained after flashing, and in-situ hydrogenation reaction in Process step-3 is divided into two fractions in a splitter. The top fraction containing hydrocarbon stream having boiling range between 70 and 140° C. is withdrawn from the splitter's top and after condensation is collected into reflux drum. At least a portion of the hydrocarbon liquid in reflux drum is fed to the splitter as reflux and the remaining part is recycled back to the Reactor-1 in Process step-1 along with fresh feedstock. After sufficient elapse of time (8 to 48 hours) and attending steady state, a third stream is withdrawn from the reflux drum as low flash de-aromatized product with benzene content preferable less than 1 ppmw and aromatic content preferably less than 30 ppmw. The bottom fraction withdrawn from the splitter bottom contains hydrocarbons with boiling range preferably between 140 and 340° C. The benzene content in splitter bottom is preferably less than 0.5 ppmw and aromatic content preferably less than 5 wt %, more preferably less than 3 wt % and most preferably less than 2 wt %.

In one of the embodiments, the LPS bottom is fractionating into two fractions, the top fraction is low in aromatics, however, high in benzene content, whereas the bottom fraction is low in benzene content but high aromatics content.

In another embodiment, the boiling range of top fraction is preferably between 70 and 140° C., preferably between 80 and 130° C. and most preferably between 90 and 120° C. In the same embodiment, it is disclosed that the benzene content in top cut is preferably below 40 ppmw, more preferably below 30 ppmw and most preferably below 20 ppmw. The total aromatic content is preferably below 60 ppmw, more preferably below 40 ppmw and most preferably below 30 ppmw.

A portion of top fraction is recycled back to Reactor-1 along with fresh feed for benzene reduction preferably below 5 ppmw, more preferably below 2 ppmw and most preferably below 1 ppmw. Recycling of top fraction back to Reactor-1 helps in reduction of benzene. The ratio of recycle stream:reflux stream:product stream is preferably between 5:7:1 and 20:7:1 and most preferably between 5:7:1 and 10:7:1. The ratio of reflux, recycle and product can be adjusted depending on the benzene content and product characteristics.

In another embodiments, the splitter bottom contains hydrocarbons boiling between 140 and 340° C., more preferably between 130 and 330° C. and most preferably between 120 and 320° C. The benzene content in splitter bottom is preferably less than 0.5 ppmw and aromatic content preferably less than 5 wt %, more preferably less than 3 wt % and most preferably less than 2 wt %.

Process step-5: The primary objective of this process step is to produce medium flash and high flash ultra-low de-aromatized distillates. Accordingly, the bottom fraction obtained from Process step-4 is further processed in a hydrogenation reactor system (Reactor-2) in presence of hydrogen, over hydrogenation catalyst system known in the art. The process conditions maintained in Reactor-2 is suitable for hydro de-aromatization (HDA) reactions. The aromatic content in the Reactor-2 effluent is preferably below 30 ppmw, more preferably below 20 ppmw and most preferably below 10 ppmw.

The process conditions for Process step-5 are disclosed as below:

Weighted average bed temperature (WABT) of catalyst is preferably between 150 and 300° C., more preferably between 160 and 275° C. and most preferably between, 170 and 250° C.

Average hydrogen partial pressure inside Reactor-2 is between 20 and 75 kg/cm² g, more preferably between 30 and 65 kg/cm² g and most preferably between 40 and 60 kg/cm² g.

Linear hourly space velocity (LHSV) between 1.5 and 4 h$^{-1}$, more preferably between 1 and 3 h$^{-1}$ and most preferably between 0.5 and 2 h$^{-1}$ with respect to hydrogenation catalyst.

The hydrocarbon to hydrogen ratio is preferably between 300 and 1200 Nm³/m³, more preferably between 300 and 1000 Nm³/m³, and most preferably between 500 and 700 Nm³/m³.

The catalyst system for process step-5 is any conventional hydrogenation catalyst known in the art. The catalyst is active in reduced form. The catalyst system comprises of metal or metals from Group VIII, preferably nickel more preferably Palladium or Platinum or combination thereof on alumina support or any other support material having higher or at least same surface area and stability. Hydrogenation catalyst system is susceptible to sulfur and H$_2$S poison, hence fresh hydrogen is feed to the Reactor-2 along with stripper bottom feed. The Reactor-2 effluent is then routed to separate HPS, LPS and then sent to distillation column in Process step-6.

Process step-6: The effluent of process step-5 containing hydrocarbon stream boiling range between 120 and 340° C. is fractionated into narrow cuts in a fractionator for generating de-aromatized distillates with specific boiling range and flash points. The aromatic content in top cut and the bottom cut is preferably below 30 ppm and 100 ppmw respectively.

In another embodiment, at least a portion of bottom fraction is recycled to Reactor-2 along with bottom fraction obtained from the process step-4. The recycling of bottom fraction back to Reactor-2 helps in reduction of aromatics. After sufficient elapse of time (8 to 48 hours) and attending steady state, bottom cut is withdrawn from the fractionator with aromatic content preferably less than 30 ppmw. The bottom cut contains hydrocarbons with boiling range preferably between 220 and 340° C.

The ratio of recycle stream:product stream from the fractionator is preferably between 4:9 and 20:9 and most preferably between 5:7 and 10:7. Ratio of reflux, recycle and product can be adjusted depending on the aromatic content and product characteristics.

The top cut from the fractionator have boiling range preferably between 140-240° C., more preferably between 130-230° C. and most preferably between 120-220° C. The top cut having aromatics preferably less than 30 ppm, more preferably less than 20 ppm and most preferably less than 10 ppm is withdrawn as medium flash solvents.

The bottom cut from the fractionator have boiling range preferably between 220-320° C., preferably between 230-330° C. and most preferably between 240-330° C. The bottom cut having aromatics preferably less than 100 ppm, more preferably less than 50 ppm and most preferably less than 30 ppm is withdrawn as high flash solvents.

The present invention is illustrated by the schematic diagram given in FIG. 1.

The hydrocarbon feedstock through line-1 and hydrogen through line-2 is mixed; and fed to Reactor-1 (A) via line-3 and line-4. The Reactor-1 effluent is sent to high pressure separator (HPS) (B) via line-5. In the HPS (B), hydrogen reach off-gas is withdrawn through line-6 and water, if formed in (A) is withdrawn through line-8. The hydrocarbon phase from (B) is withdrawn and sent to LPS (C) via line-9. The off-gas as well as hydrocarbon fraction boiling below 90° C. is withdrawn via line-9 and sent for further processing. The LPS bottom stream is sent to splitter (D) via line-10. The top stream from (D) is withdrawn through line-11 and sent to Reflux vessel (E). One part of hydrocarbon collected in (E) is sent to (D) as reflux via line-12, the $2^{nd}$ part is recycled back to (A) via line-14 and the $3^{rd}$ part is withdrawn as product (low flash) via line-13. The splitter bottom stream is withdrawn via line-15.

Figure 2:
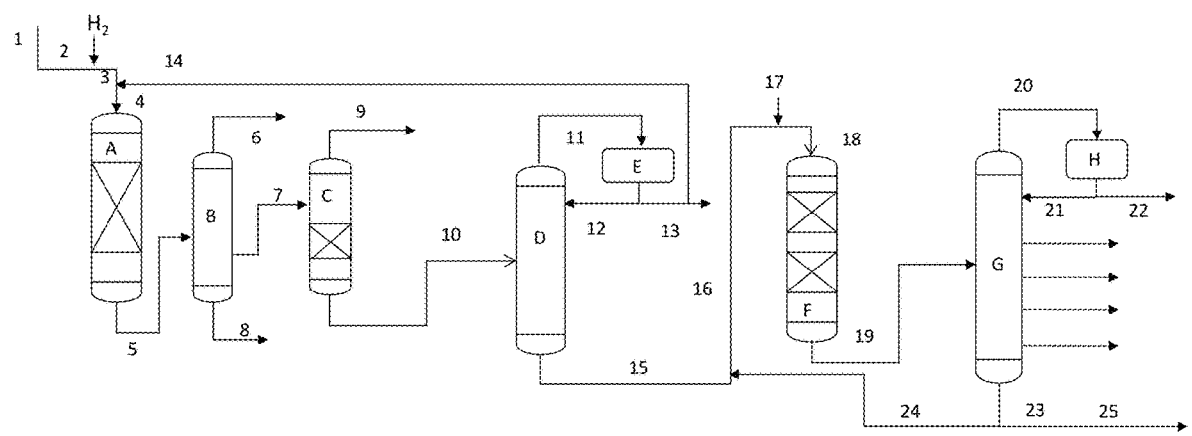
FIG. 2: illustrates additional features of the present invention.

The additional features of present invention are illustrated in FIG. 2.

The splitter bottom stream is withdrawn through line-15 is sent to Reactor-2 (F) via line-16 and 18. Fresh hydrogen is added to splitter bottom via line-17. Effluent from (F) is withdrawn via line-19 and sent to Fractionator (G) via line-19. The top most fraction is withdrawn via line-20 and sent to Reflux pot (H), Reflux from (H) is sent to (G) via line-21 and top most product is withdrawn via line-22. The bottom most fraction from G is withdrawn as product via line-23. Part of bottom fraction is recycled back to (F) through line-24 and part is withdrawn as bottom most product via line-25.

EXAMPLES

Example-1

Hydrocarbon feedstock (A) is hydrotreated in a pilot plant facility; reactors are loaded with conventional hydrotreating catalyst system (Ni/Co/Mo). The pilot plant reactors are maintained at 330° C. (WABT) and 70 bar g $H_2$ partial pressure. Other operating parameters i.e., LHSV and $H_2$/HC ratio are maintained similar to commercial hydro processing unit i.e., 1 $h^{-1}$ and 500 $Nm^3/m^3$. The purity of hydrogen is around 99.9%. The reactor outlet sample collected and characterized. The characterization of Feedstock (A) and Reactor effluent are given in Table 1.

TABLE 1

Properties of Feedstock A and Reactor-1 Effluent

| S. No. | Property | Feedstock A | Reactor-1 Effluent |
|---|---|---|---|
| 1. | Sulfur (wt %/ppmw) | 0.9 | <0.5 |
| 2. | Boiling range (° C.) - ASTM D 2887 | 100-300 | 70-300 |
| 3. | Nitrogen (ppmw) | 20 | <0.5 |
| 4. | Aromatics (wt %) - by HPLC | 20 | 3 |
| 5. | Density (g/cc) | 0.8033 | 0.7960 |
| 6. | Benzene (ppmw) - by GC | 90 | 22 |

Similar to any commercial unit the Reactor effluent is flashed in the high-pressure separator (HPS). As described, the HPS is maintained at 240° C. and 70 bar g pressure. The HPS bottom is sent to Low pressure separator (LPS) maintained at 180° C. and 15 bar g pressure. The LPS bottom is sent to atmospheric column. The pilot plant atmospheric fractionator is capable of producing 2 cuts, Top and Bottom. The samples of top and the bottom cut is collected and characterized. The properties of top and bottom cut are shown in Table 2.

TABLE 2

Properties of cuts

| S. No. | Properties | Top cut | Bottom Cut |
|---|---|---|---|
| 1. | Sulfur (ppmw) | <0.5 | <0.5 |
| 2. | Boiling range (° C.) | 90-140 | 140-300 |
| 3. | Aromatics (ppm) - by UV | 50 | — |
| 4. | Aromatics (wt %) by HPLC | — | 5 |
| 5. | Benzene (ppmw) - by GC | 30 | <1 |
| 6. | Flash point (° C.) | <50 | >60 |

Example-2

After completion of $1^{st}$ experiment mentioned in Example-1, the pilot plant facility was again made ready for $2^{nd}$ experiment. In the $2^{nd}$ experiment, the reactor systems were loaded with same Ni/Co/Mo catalyst, however, additionally the hydrogenation catalyst (Ni-based) was also loaded in LPS vessel by opening its top-cap. The pilot plant run was conducted with same feedstock (A) and all operating parameters were maintained similar to the $1^{st}$ experiment. The LPS bottom, fractionators top and bottom samples were characterized and the properties are given in Table-3.

TABLE 3

Properties of LPS effluent and cuts

| S. No. | Property | LPS bottom | Top Cut | Bottom Cut |
|---|---|---|---|---|
| 1. | Sulfur (ppmw) | <0.5 | <0.5 | <0.5 |
| 2. | Boiling range (° C.) | 90-300 | 90-140 | 140-300 |
| 3. | Nitrogen (ppmw) | <0.5 | <0.5 | <0.5 |
| 4. | Aromatics (ppmw) by UV | — | 30 | — |
| 5. | Aromatics (wt %) by HPLC | 2.6 | — | 4.7 |
| 6. | Density (g/cc) | 0.799 | 0.767 | 0.8096 |
| 7. | Benzene (ppmw) - by GC | 3 | 7 | <1 |

The LPS, which also works a reactor after loading catalyst, operates at WABT: 180° C., Total Pressure: 15 bar g, LHSV: 1.33 h$^{-1}$, H2/HC ratio: 0 Nm$^3$/m$^3$. It is to be noted that HAD reaction in LPS takes in presence of dissolved hydrogen.

Example-3

In continuation with Example-2, further, about 30% of atmospheric fractionator top collected in reflux pot after condenser is recycled back to Reactor via a high pressure pump. The reflux to the fractionator was maintained similar as in $1^{st}$ and $2^{nd}$ Experiments. The sample of top and bottom fractions analyzed and the results are given in Table-4.

TABLE 4

Properties of LPS effluent, top cut and bottom cut

| S. No. | Property | LPS effluent | Top Cut | Bottom Cut |
|---|---|---|---|---|
| 1. | Sulfur (ppmw) | <0.5 | <0.5 | <0.5 |
| 2. | Boiling range (° C.) | 90-320 | 90-140 | 140-300 |
| 3. | Nitrogen (ppmw) | <0.5 | <0.5 | <0.5 |
| 4. | Aromatics (ppmw) by UV | — | 25 | — |
| 5. | Aromatics (wt %) by HPLC | 2.6 | — | 4.7 |
| 6. | Density (g/cc) | 0.799 | 0.767 | 0.8096 |
| 7. | Benzene (ppmw) - by GC | <1 | <1 | <1 |

Example-4

The bottom fraction of atmospheric fractionator of Pilot Plant is collected and processed in a separate Micro reactor unit (MRU) in the presence of hydrogenation catalyst system (Ni-based). The MRU product then collected and distilled in a batch distillation unit. Two fractions viz. cut-1 and cut-2 generated, and their properties have been analyzed, given in Table 5. The operating condition maintained in MRU is given in Table 6.

TABLE 5

Properties of reactor-2 effluent and fractionator cuts

| S. No. | Property | MRU Pdt. Properties | Cut-1 | Cut-2 |
|---|---|---|---|---|
| 1. | Sulfur (ppmw) | <0.5 | <0.5 | <0.5 |
| 2. | Boiling range (° C.) | 138-300 | 138-200 | 200-300 |
| 3. | Nitrogen (ppmw) | <0.5 | <0.5 | <0.5 |
| 4. | Aromatics (ppmw) by UV | 25 | 20 | 96 |
| 5. | Density (g/cc) | 0.7989 | 0.7905 | 0.810 |
| 6. | Benzene (ppmw) - by GC | <1 | <1 | <1 |
| 7. | Flash point (° C.) | — | >50 | >70 |

TABLE 6

Operating condition of MRU

| S. No. | Parameters | Values |
|---|---|---|
| 1. | WABT (° C.) | 190 |
| 2. | H$_2$ partial pressure (bar g) | 40 |
| 3. | LHSV (h$^{-1}$) | 1 |
| 4 | H$_2$/HC ratio (Nm$^3$/m$^3$) | 520 |

Advantage of the present process:
(i) Any refinery streams can be processed
(ii) No pretreatment of feedstock is required
(iii) The aromatic content of product fractions can be adjusted as per the requirement of product specification

We claim:

1. A process for production of de-aromatize distillate from a hydrocarbon feedstock, the process comprising:
   a) treating the hydrocarbon feedstock over a hydrotreating catalyst under hydrogen, in a hydrotreating reactor system (Reactor-1) for converting hetero-atom contaminants into their respective hydrides;
   b) flashing an effluent from the Reactor-1 in a high-pressure separator (HPS), and withdrawing an off-gas containing un-reacted hydrogen along with gaseous inorganic and organic compounds from a top of the HPS and a liquid hydrocarbon from a bottom of the HPS;
   c) flashing the liquid hydrocarbon in a low-pressure separator (LPS) to remove dissolved gases and a lighter hydrocarbon fraction having a boiling temperature below 90° C.;
   d) processing an LPS effluent in a splitter and separating the LPS effluent into two fractions: i) a top fraction consisting of a hydrocarbon stream having a boiling temperature in a range of 70-140° C., wherein the top fraction is condensed and collected in a reflux drum as a hydrocarbon liquid, and ii) a bottom cut fraction consisting of a hydrocarbon stream having a boiling temperature in a range of 140° C.-340° C.;
   e) feeding a portion of the hydrocarbon liquid to the splitter as a reflux stream and recycling the remaining part of the hydrocarbon liquid to the Reactor-1 as a recycle stream;
   f) withdrawing a product stream with benzene content less than 1 ppmw from the reflux drum;
   g) hydrogenating the bottom cut fraction in a Reactor-2 over a hydrotreating catalyst under hydrogen to obtain a Reactor-2 effluent; and
   h) fractionating the Reactor-2 effluent from step g) containing a hydrocarbon stream having a boiling point in a range between 120-340° C. into narrow cuts in a fractionator to obtain de-aromatized distillates, wherein, a topmost cut has an aromatic content below 30 ppm and a bottom most cut has an aromatic content below 1000 ppmw.

2. The process as claimed in claim 1, wherein the hydrocarbon feedstock comprises streams having boiling temperature in a range of 90° C.-350° C.

3. The process as claimed in claim 1, wherein the hydrocarbon feedstock has a sulfur content in a range of 0.1-1.5 wt %, and a nitrogen content in a range of 50-1000 ppmw.

4. The process as claimed in claim 1, wherein the hydrocarbon feedstock has an aromatic content in a range of 5-40 wt %, a di-aromatic content of ≤3 wt %, and a poly-aromatics content of ≤0.001 wt %.

5. The process as claimed in claim 1, wherein the Reactor-1 is operated at:
   a. a weighted average bed temperature (WABT) of catalyst in a range of 250-450° C.;
   b. a hydrogen partial pressure in a range of 30-120 $kg/cm^2$ g;
   c. a linear Hourly Space Velocity (LHSV) in a range of 0.2-4 $h^{-1}$; and
   d. a hydrocarbon to hydrogen ratio in a range of 300-1200 $Nm^3/m^3$.

6. The process as claimed in claim 1, wherein the high-pressure separator (HPS) is maintained at a pressure in a range of 35-140 $kg/cm^2$ g, and at a temperature in a range of 260-350° C.

7. The process as claimed in claim 1, wherein a top part of the low-pressure separator (LPS) functions as a separator and a bottom part of the low-pressure separator loaded with a hydrogenation catalyst acts as a reactor.

8. The process as claimed in claim 1, wherein the LPS is operated at a temperature in a range of 150-270° C., at a pressure in a range of 9-27 $kg/cm^2$ g, and with a residence time in a range of 40-15 minutes.

9. The process as claimed in claim 7, wherein the hydrogenation catalyst comprises metals selected from nickel, palladium, platinum, or a combination thereof, wherein the metal is supported on an alumina support.

10. The process as claimed in claim 1, wherein two LPS are provided in a lead lag arrangement.

11. The process as claimed in claim 1, wherein the top fraction has a boiling temperature in a range of 90-120° C., and a benzene content of ≤20 ppmw, and an aromatic content of ≤30 ppmw.

12. The process as claimed in claim 1, wherein the bottom cut fraction has a boiling temperature in a range of 120 and 320° C., and a benzene content ≤0.1 ppmw, and an aromatic content ≤2 wt %.

13. The process as claimed in claim 1, wherein the recycle stream, the reflux stream, and the product stream are in a ratio in a range of 5:7:1-20:7:1.

14. The process as claimed in claim 1, wherein the benzene content in the product stream of step f) is ≤0.1 ppmw, and the aromatic content is ≤10 ppmw.

15. The process as claimed in claim 1, wherein the bottom cut fraction of step g) is hydrogenated in the Reactor-2 at a weighted average bed temperature (WABT) in a range of 150-300° C., an average hydrogen partial pressure in a range of 20-75 $kg/cm^2$ g, a Linear hourly space velocity (LHSV) in a range of 1.5-4 $h^{-1}$ and a hydrocarbon to hydrogen ratio in a range of 300-1200 $Nm^3/m^3$.

16. The process as claimed in claim 1, wherein the effluent of the Reactor-2 has an aromatic content of ≤10 ppmw.

17. The process as claimed in claim 1, wherein the effluent of the Reactor-2 is fractionated into cut-1 and cut-2, wherein the cut-1 has 20 ppmw by UV of aromatics, a boiling point in a range of 130-200° C., and a flash point of at least 50° C., and wherein the cut-2 has 96 ppmw by UV of aromatics, a boiling point in a range of 200-300° C., and a flash point of at least 70° C.

18. The process as claimed in claim 1, wherein the topmost cut has a boiling temperature in a range of 140-240° C., and an aromatic content of ≤10 ppmw.

19. The process as claimed in claim 1, wherein the bottom most cut has a boiling temperature in a range of 220-320° C., and an aromatic content of ≤30 ppmw.

* * * * *